United States Patent [19]

Beggs et al.

[11] 4,306,903
[45] Dec. 22, 1981

[54] METHOD FOR REDUCING PARTICULATE IRON OXIDE TO MOLTEN IRON WITH SOLID REDUCTANT AND OXY-FUEL BURNERS

[75] Inventors: Donald Beggs, Charlotte, N.C.; Bruce G. Kelly, Fort Mill, S.C.; David C. Meissner, Charlotte, N.C.

[73] Assignee: Midrex Corporation, Charlotte, N.C.

[21] Appl. No.: 204,124

[22] Filed: Nov. 5, 1980

Related U.S. Application Data

[60] Division of Ser. No. 60,691, Jul. 25, 1980, Pat. No. 4,248,408, which is a continuation-in-part of Ser. No. 892,564, Apr. 3, 1978, Pat. No. 4,179,278, which is a continuation-in-part of Ser. No. 769,242, Feb. 16, 1977, Pat. No. 4,082,543.

[51] Int. Cl.$^3$ .................................................. C21C 5/52
[52] U.S. Cl. .......................................... 75/11; 75/38; 75/40
[58] Field of Search .............................. 75/11, 38, 40

[56] References Cited

U.S. PATENT DOCUMENTS

| | | | |
|---|---|---|---|
| 1,057,213 | 3/1913 | Benjamin | 75/10 R |
| 2,978,315 | 4/1961 | Schenck et al. | 75/11 X |
| 3,236,628 | 2/1966 | Von Bogdandy | 75/11 |
| 4,140,301 | 2/1979 | Beggs | 266/99 |

*Primary Examiner*—M. J. Andrews
*Attorney, Agent, or Firm*—Ralph H. Dougherty

[57] ABSTRACT

A method and apparatus for reducing particulate iron oxide to molten iron utilizing solid carbonaceous fuel as reductant in a shaft type reducing furnace, in which a furnace burden is formed of a mixture of iron oxide lumps or pellets and particulate solid fuel. Reacted top gas is upgraded and recirculated through the burden in counterflow relationship thereby heating and reducing the burden. The heat for reduction is generated by passing electric current through the burden. A portion of the heat for melting of reduced iron and a supplemental source of hot reducing gas is provided by oxy-fuel burners located in the shaft furnace above the molten iron pool.

6 Claims, 2 Drawing Figures

METHOD FOR REDUCING PARTICULATE IRON OXIDE TO MOLTEN IRON WITH SOLID REDUCTANT AND OXY-FUEL BURNERS

This application is a divisional application of U.S. patent application Ser. No. 60,691 filed July 25, 1980, now U.S. Pat. No. 4,248,408, which is a continuation-in-part application of U.S. patent application Ser. No. 892,564 filed Apr. 3, 1978, now U.S. Pat. No. 4,179,278, which is a continuation-in-part application of U.S. patent application Ser. No. 769,242 filed Feb. 16, 1977, now U.S. Pat. Nos. 4,082,543 and 4,140,301.

BACKGROUND OF THE INVENTION

In recent years the direct reduction of iron oxide to metallic iron has become a practical commercial reality with increasing worldwide acceptance and production. The direct reduced iron which results from direct reduction of iron oxide has a commercially demonstrated utility in iron and steelmaking and particularly in electric arc furnace steelmaking.

Direct reduced iron, which is sometimes known as sponge iron, is not suited as the principal feed material for steelmaking furnaces other than electric arc furnaces. Other steelmaking processes such as the basic oxygen process and the bottom blown oxygen process require large quantities of hot metal, or molten metal as feed material. Thus, for oxygen furnace feed, it is desired to produce a molten product from a direct reduction furnace.

A known type process gasifies solid fuel in a separate combustion-type gasifier utilizing oxygen and steam for gasification. The gas from the gasifier is then cooled and scrubbed, desulfurized, then utilized in a direct reduction furnace as the source of reductant. An example of this combination of gasifier and direct reduction furnace is described in U.S. Pat. No. 3,844,766. This combination also has a fundamental thermal disadvantage in that approximately 50 percent of the solid fuel is consumed by combustion in the gasifier and only the remaining 50 percent of the fuel value is available as a source of reductant. This combination, although highly efficient in the use of the gas from the gasifier for reduction, requires approximately 4.0 to 5.0 Giga calories of solid fuel per metric ton of solid direct reduced iron product.

An electrically operated vertical shaft furnace is taught by U.S. Pat. No. 1,937,064 in which broken coke, graphite, silicon carbide or other conductors are charged to form a burden. Molten metal is then poured through the burden while electrical current also flows through the burden, thus refining the molten metal. The burden is a stationary granular mass of carbonaceous material which does not flow through the furnace. The burden also is not the material being treated, unlike the present invention.

Langhammer U.S. Pat. No. 3,894,864 purports to teach a shaft furnace for producing molten steel by use of an electric arc. The patent fails to explain the completion of the electric circuit which creates the electric arc. Applicants distinguish from this process by utilizing direct resistance heating of their burden, unlike any known reference, as well as by recirculating spent top gas to act as reductant source.

Other patents which may be of interest to the reader include Elvander et al U.S. Pat. Nos. 3,948,640 and Gross 3,948,642.

OBJECTS OF THE INVENTION

It is the principal object of the present invention to provide a method for directly reducing iron oxide to molten iron in a shaft type reduction furnace wherein solid fuel is utilized as the reductant source.

It is another object of this invention to provide a method for directly reducing iron oxide to molten iron in a shaft furnace wherein the energy input requirements are greatly reduced over present commercial direct reduction methods.

It is another object of this invention to provide means for more efficient operation of a direct reduction shaft furnace than was heretofore possible.

It is another object of this invention to provide apparatus for carrying out the above methods.

SUMMARY OF THE INVENTION

The present invention is a direct reduction method utilizing solid fuel in a novel and highly thermally efficient manner wherein the solid fuel is consumed directly in the reduction process by reaction with oxygen primarily from the iron oxide which is being reduced. The overall reactions in the furnace are endothermic, the heat required being supplied by electrically heating the burden. Minimizing the use of an external source of air or industrial oxygen for the carbon gasification reactions results in a solid fuel requirement of approximately 2.3 Giga calories per metric ton of direct reduced iron product with an electric energy requirement of approximately 700 kwh (0.6 Giga calories) per metric ton of direct reduced iron in the solid state, with an additional 0.33 Giga calories to further heat and melt the direct reduced iron and gangue provided by a combination of electric energy and the oxy-fuel burners.

BRIEF DESCRIPTION OF THE DRAWING

The present invention will be more readily understood by referring to the following detailed specification and the appended drawings in which.

DETAILED DESCRIPTION

Figure 1:
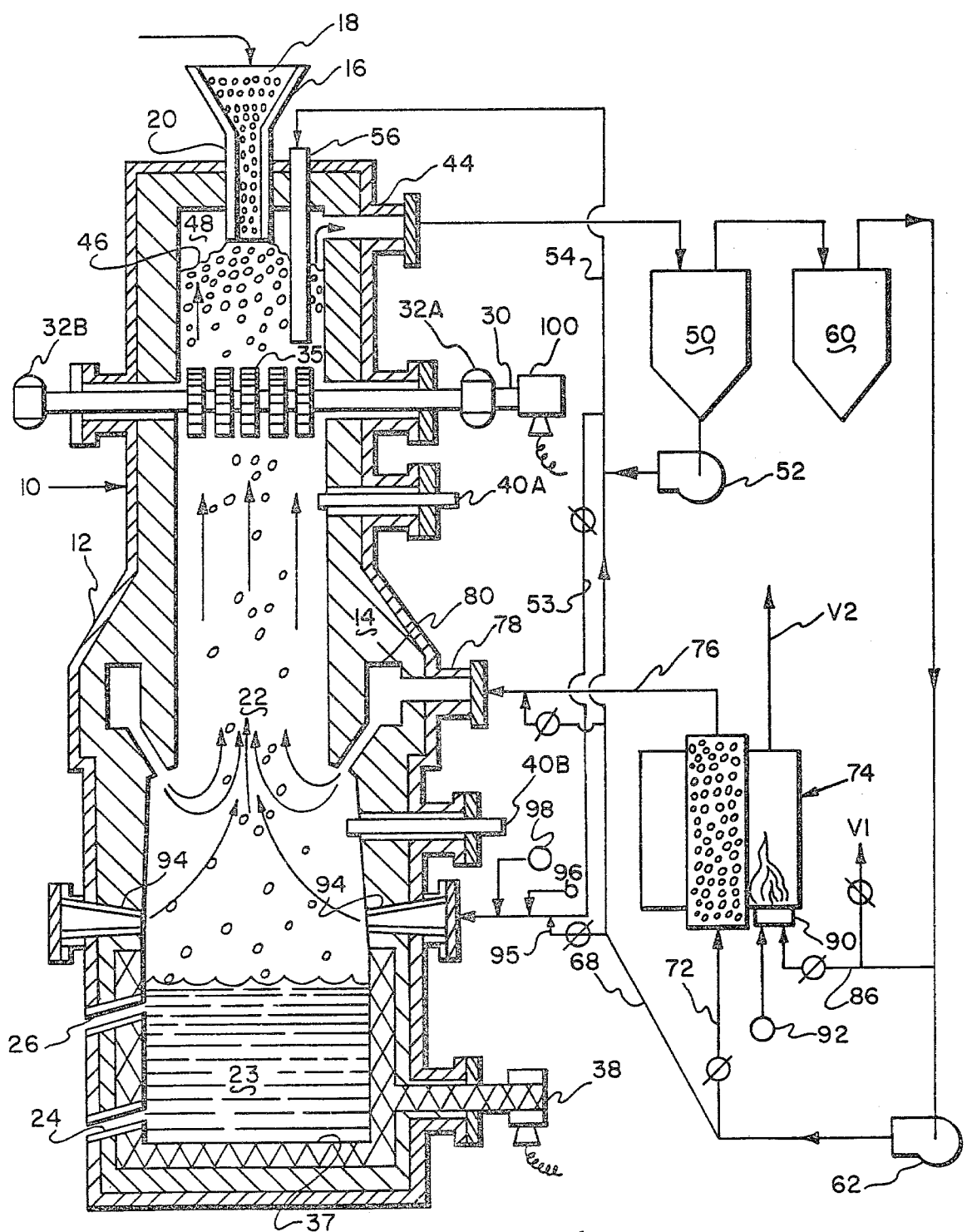
FIG. 1 is a schematic cross section of an elevational view of the shaft furnace of the present invention and related equipment in which the electric current flows parallel to the vertical axis of the furnace and the energy for heating the direct reduced iron and gangue above reduction temperature and melting it is supplied partially by electric energy and partially by oxy-fuel burners.

Referring now to the embodiment of FIG. 1, a shaft type furnace 10 having a steel shell 12 is lined with refractory 14. A feed hopper 16 is mounted at the top of furnace 10 for charging of particulate solids feed material 18 therein. The feed material consists of iron oxide in the form of pellets or lumps, solid carbonaceous fuel and limestone. The feed material descends by gravity through one or more feed pipes 20 to form a packed bed 22 of particulate solids feed material or burden in the furnace 10. Reduced molten product 23 is removed from the furnace through taphole 24. If desired, a slag taphole 26 can be provided at a higher elevation. Removal of the molten iron and slag establishes a gravitational flow of the particulate burden 22 through shaft furnace 10.

The furnace 10 is preferably cylindrical but could have any desired cross-section.

The upper region of the furnace is provided with at least one heat resistant alloy electrode 30, which extends through the steel furnace shell 12 and across the furnace width. This electrode may be fixed or journaled for rotation in bearings 32A and 32B which may be mounted externally as shown, or insulated and mounted in the furnace walls 14. Each electrode rod may be equipped with one or more heat resistant alloy discs 35 to provide an extended electrode surface area. The number of electrode rods employed is dependent upon the horizontal dimensions of the furnace. The bottom of the shaft furnace is a closed hearth lined with carbon block 37, which enables the entire hearth to act as an electrode. This carbon block hearth is connected to a source of electricity through electrode buss 38. Suitable thermocouples such as 40A and 40B are inserted into the furnace through the refractory wall at selected elevations to assist in controlling the operation of the process.

Top gas exits the furnace through a top gas outlet pipe 44 located above stockline 46. The lower end of feed pipe 20 extends below outlet pipe 44, which arrangement creates a top gas disengaging plenum 48 which permits the top gas to exit generally symmetrically from the stockline 46 and flow freely to the top gas outlet pipe 44.

A gas cleaning and recirculating circuit is provided to remove solids and condensible matter from the top gas and to cool the gas to form cold process gas. The reacted top gas leaving the shaft furnace 10 through pipe 44 flows to an oil scrubber 50 wherein tars, oils, and particulates are removed from the gas as a sludge. Pump 52 pumps the sludge back to the furnace either through pipe 53 to the oxy-fuel burners described later or through pipe 54 then through sludge injection pipe 56 which has an open lower end extending well beneath the stockline 46 to insure reaction of sludge components with the burden and to prevent top gas from recycling these components back into the oil scrubber.

The top gas passes from the oil scrubber 50 to a water scrubber 60 wherein the gas is further cooled and cleaned. A gas recirculating blower 62 draws the cooled and cleaned process gas from the scrubber 60. A portion of the process gas is introduced to pipe 68 to assist in injecting the sludge into the shaft furnace. Some process gas must normally be vented because when solid carbon in the furnace reacts with oxygen from the iron oxide, carbon monoxide gas and carbon dioxide gas are formed. Since this reaction involves a gaseous expansion, excess gas may be vented through vent V1. Of course, this excess gas provides a source of energy for use elsewhere.

A second portion of the process gas passes through pipe 72 into gas preheater 74 wherein the gas is heated to reducing temperature of about 900° to 1000° C. The heated gas flows through pipe 76 and is introduced to the furnace through hot process gas inlet 78 and bustle 80. Another portion of the process gas is fed into pipe 86 as fuel for preheater burner 90. Combustion air for the burner 90 is provided by air source 92.

A multiplicity of oxy-fuel burners 94, two of which are shown, are positioned peripherally in the lower region of furnace 10 below process gas inlet bustle 80 and above the pool of molten iron 23. The burners 94 may be fired with the sludge removed from oil scrubber 50 and conveyed with pump 52 through pipe 53 utilizing process gas from pipe 68 and pipe 95 to assist in conveying or by any external fuel 94 from source 96 such as pulverized coal, oil, tar, or natural gas. A portion of the process gas may be introduced through line 95 to assist in conveying the external fuel from source 96 to the burner if required. The external fuel 96 or sludge injected through pipe 53 will be burned with a less than stoichiometric quantity of oxygen from an external source 98 to produce a flue gas that has a sufficient excess of the reductants $CO+H_2$ relative to the oxidants $CO_2+H_2O$ to be reduced to iron oxide. This flue gas will flow upwardly through the furnace 10 and will exit through outlet pipe 44. The oxy-fuel burners 94 will also supply a portion of the heat required to melt the reduced iron and associated slag.

One or more electrodes 30 are provided, depending upon the dimensions of the horizontal cross-section of the furnace. The electrode acts as a feeder mechanism as well as a cluster breaker for material in the upper zone of the furnace. Each electrode can carry one or more radially extending breaker segments 35 and can be connected to and driven by oscillatible drive mechanism 100. Each cluster breaker segment preferably extends only about 180 to 270 degrees about the electrode, but alternatively it may extend completely around the electrode. Thus, as the electrode oscillates within the bearings, it acts as both a feed mechanism and cluster breaker mechanism. It feeds material alternately by moving material downwardly from opposite walls of the furnace while simultaneously breaking any clusters of the hot cohesive material.

In the method of this invention, iron oxide pellets, lump ore or other suitable iron oxide feed material is mixed with limestone and solid carbonaceous fuel such as coal, coke, or lignite, then fed through feed pipe 20 to the interior of the furnace 10 to form burden 22 therein as a packed bed.

The major portion of the furnace heat is supplied electro-thermally by passing electric current through the burden between the hearth electrode 37 and the upper alloy electrode 30 in the furnace. Directly reduced iron pellets or lumps are electrically conductive even at the earliest stage of reduction when metallic iron is formed only on the pellet surface. When starting up operation of the electric powered shaft furnace of the present invention, the furnace is charged with reduced or partially metallized directly reduced iron pellets, petroleum coke or any other electrically conductive material. Other conductive materials are utilized when reduced or partially metallized pellets are unavailable. It has been determined that pellets with metallizations as low as 6 percent are conductive.

Figure 2:
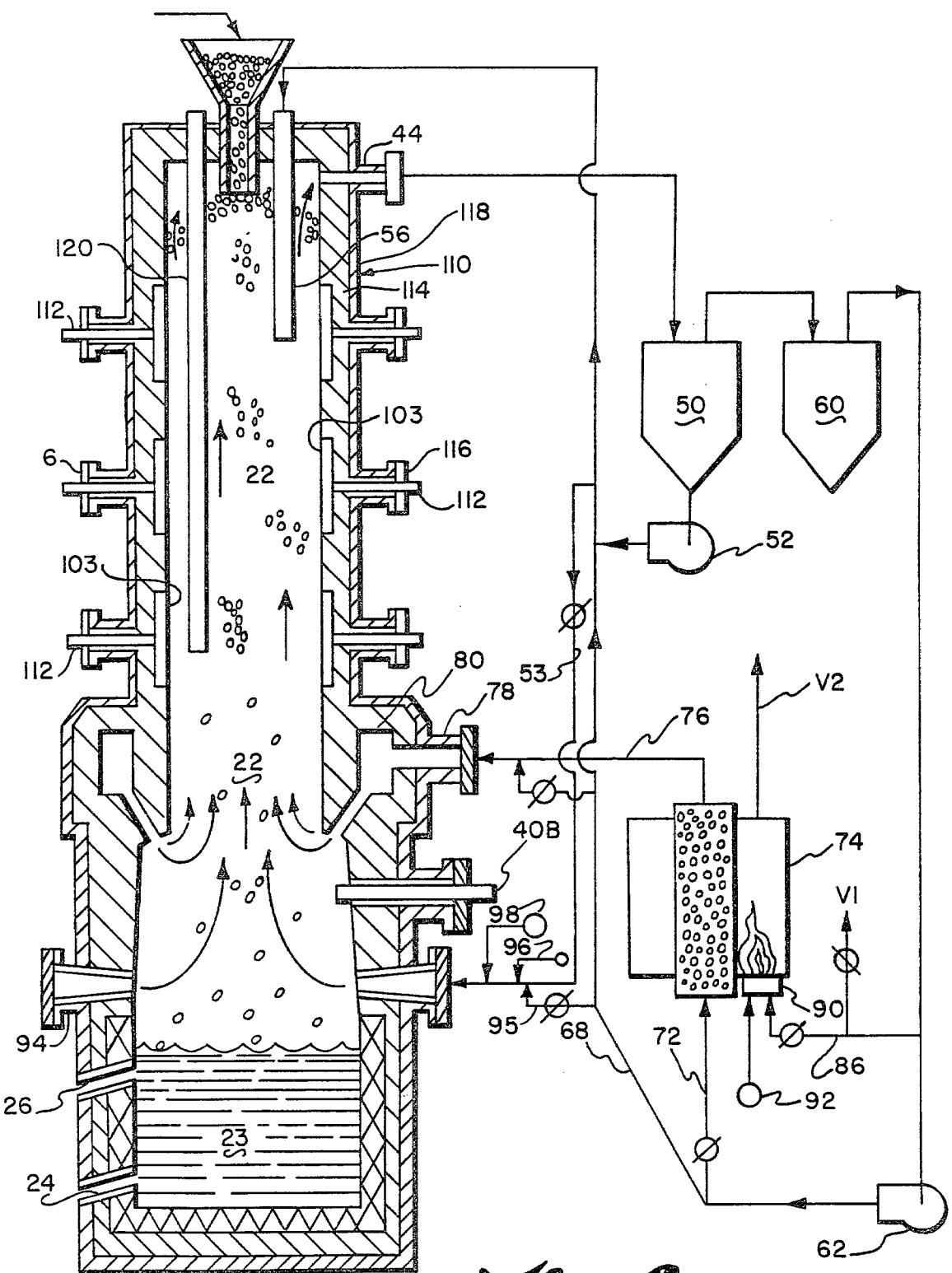
FIG. 2 is a schematic cross section of an elevational view of an alternative embodiment of the present invention in which the electric current flows perpendicular to the vertical axis of the furnace and all the energy for heating the direct reduced iron and gangue above reduction temperature and melting it is supplied by the oxy-fuel burners.

An alternative embodiment of the invention depicted in FIG. 2 utilizes opposing pairs of electrode plates 103 to supply the electric energy requirement for the reduction reaction and utilizes oxy-fuel burners 94 to supply all the additional energy to further heat and melt the direct reduced iron and gangue.

The furnace 110 of this embodiment is preferably square or rectangular, or has curvilinear sides which approach a square or rectangle when seen in horizontal cross section. The middle region of the furnace is provided with heat resistant alloy electrode plates 103 connected to electrode lead rods 112, which are in turn connected to an electric power source not shown. Electrode plates 103 are preferably recessed into the refractory wall 114 to create a substantially smooth interior wall face. The electrode plates are so positioned to form opposing pairs. Three opposing pairs of electrode plates are shown in FIG. 2, vertically spaced through the furnace for reasons of process control. The electrode lead rods 112 are mounted on suitable electrical insulating material 116 such as asbestos board which serves to insulate the rod 112 from the steel furance shell 118. A heat resistant alloy pipe 120 having a closed lower end extends vertically through the furnace roof and into the burden as far as the region of the lower-most pair of electrode plates 103. Suitable thermocouples, not shown, are inserted into the thermocouple pipe 120 to sense the temperature of the burden at selected elevations, particularly at the elevation of each pair of electrode plates.

The shaft furnace includes three distinct process zones. The upper region constitutes a prereduction zone in which the burden is heated by convection of gases moving in counterflow relation to the flow of the burden. Coal or other carbonaceous fuel in the feed liberates condensible and noncondensible volatiles. The noncondensible volatiles, which are mostly hydrogen or hydrocarbons, exit as top gas, then are cleaned and recirculated as process gas. The pellet burden acts as a moving packed bed pebble quench which is very effective in preventing heavy liquid compounds from plugging gas outlet pipes. Some heavy oils and tars tend to weep out of the coal and are absorbed by the oxide feed to subsequently react with $CO_2$ and water vapor in the process gas. A high ratio of oxide feed to heavy liquid compounds reduces the tendency of the burden to cluster excessively near the burden stockline. In this prereduction zone, the oxide feed material is reduced to low metallization, i.e. metallization less than 25 percent, by reaction with reductants $H_2$ and CO in the upwardly moving gases. Thus the burden becomes electrically conductive before it leaves the prereduction zone.

The central region of the shaft furnace constitutes a reduction zone in which metallic iron is formed by reaction with the char formed from the reaction of the carbonaceous fuel with oxygen from the iron oxide. The reactions in the reduction zone are endothermic. The required heat in the reduction zone is supplied electrothermally. This heat requirement is approximately 700 kWh (0.6 Giga calories) per metric ton of direct reduced iron. Excess heat in the reducing zone will cause the pellets to soften and the burden to become a pasty mass which will tend to prevent upflow of process gas through the burden, or to curtail upflow of reducing gas. The circulation of the process gas from bustle 80 through the burden will help in maintaining the burden in solid particulate form until it reaches the melting zone.

The lower region of the furnace constitutes a melting zone wherein the hot reduced pellets are melted prior to discharge. The additional heat requirement to melt the pellets is about 0.33 Giga calories per metric ton. In FIG. 1 this heat is supplied in part by electrothermal heating and in part by the oxy-fuel burners. In FIG. 2 this heat is supplied entirely by the oxy-fuel burners 94. These burners enable the reduced pellets to be heated above the reducing temperature and to be melted independent of the electrical power requirement in the reduction zone. These burners also supply a hot reducing gas which decreases the power requirement for the reduction zone and the solid carbonaceous fuel requirement in the furnace feed.

The product discharge from the shaft furnace is molten iron with about 3 to 12 percent impurities. The iron may be converted to steel in an oxygen steelmaking furnace, or it can be used as pig iron.

The coal in the feed material may range from about 5 to about 20 percent by weight of the charge, depending on the heating values of the coal selected.

A small amount, up to about 5 weight percent, of limestone or dolomite or a mixture thereof may be added to the feed material to react with sulfur which may be liberated within the furnace. This nonmetallic material can be separated from the molten iron product as slag or gangue. An additional amount of limestone or dolomite is added to the feed to fluidize the slag in accordance with normal slagging practice.

As a specific example of the operation of the furnace, calculations have been made regarding the gas flow rates, gas temperatures and gas compositions at a number of locations in the process flow diagram as depicted in the drawings. These calculations have been based on an oxide feed analysis of 97 percent $Fe_2O_3$, with 3 percent gangue materials. 10 percent more coal than is theoretically required, having a proximate analysis of 50.1 percent fixed carbon, 3.8 percent water, 37.0 percent volatiles and 9.1 percent ash was used as a basis for these calculations. This is a high volatile grade B bituminous coal. The same coal is used as fuel for the oxy-fuel burners. The tar and oil yield from the coal is about 0.17 cubic meters per metric ton. Tars and oil present in the top gas are 33,600 milligrams per normal cubic meter. The temperature in the reducing zone is 980° C. The metallization of the ultimate product is 92 percent with the metallization taking place in the prereduction zone being 20 percent. The use of excess coal will result in carburizing the iron product.

Tables 1 and 2 show computed operating figures for a direct reduction furnace operated in accordance with the invention. The gas analyses are typical operating figures at the locations indicated by the letter headings. These locations are as follows:

A. Top gas upon exit from top gas outlet 44.
B. Gas exiting water scrubber 60.
C. Gas passing through vent V1.
D. Gas entering furnace inlet 78.
E. Gas admitted to burner 90 from line 86.
F. Gas from oxy-fuel burner 94 at point of mixture with gas from furnace inlet 78.
G. Gas mixture into the reduction zone.
H. Gas mixture out of the reduction zone.
I. Oxygen being admitted to burner 94 from source 98.

Gas flows in the tables are given in normal cubic meters per metric ton ($Nm^3/t$) of product.

Table 1 shows the operating figures for a direct reduction furnace being operated in accordance with FIG. 1 where 50% of the energy required to heat the direct reduced iron and gangue above reduction temperature and to melt it is supplied by the oxy-fuel burner.

TABLE 1

|  | A | B | C | D | E | F | G | H | I |
|---|---|---|---|---|---|---|---|---|---|
| Flow - (Nm³/t Prod) | 1440 | 1405 | 480 | 684 | 241 | 182 | 866 | 1410 | 69 |
| Temp. - (°C.) | 299 | 43 | 43 | 982 | 43 | 982 | 982 | 982 | 25 |
| Analysis - |  |  |  |  |  |  |  |  |  |
| % CO | 46.7 | 47.9 | 47.9 | 52.0 | 47.9 | 54.8 | 52.5 | 62.6 | — |
| % CO₂ | 22.4 | 23.0 | 23.0 | 18.9 | 23.0 | 11.4 | 17.3 | 7.7 | — |
| % H₂ | 20.5 | 21.0 | 21.0 | 16.9 | 21.0 | 24.2 | 18.5 | 23.3 | — |
| % H₂O | 8.3 | 6.0 | 6.0 | 10.1 | 6.0 | 8.3 | 9.7 | 4.9 | — |
| % CH₄ | 1.6 | 1.6 | 1.6 | 1.6 | 1.6 | 0.3 | 1.4 | 1.0 | — |
| % N₂ | 0.5 | 0.5 | 0.5 | 0.5 | 0.5 | 1.0 | 0.6 | 0.5 | 2 |
| % O₂ | — | — | — | — | — | — | — | — | 98 |

Table 2 shows the operating figures for a direct reduction furnace being operated in accordance with the invention with the apparatus depicted in FIG. 2.

TABLE 2

|  | A | B | C | D | E | F | G | H | I |
|---|---|---|---|---|---|---|---|---|---|
| Flow - (Nm³/t Prod) | 1445 | 1408 | 633 | 527 | 248 | 364 | 892 | 1416 | 138 |
| Temp - (°C.) | 306 | 43 | 43 | 982 | 43 | 982 | 982 | 982 | 25 |
| Analysis - |  |  |  |  |  |  |  |  |  |
| % CO | 46.2 | 47.4 | 47.4 | 51.7 | 47.4 | 54.8 | 53.0 | 61.9 | — |
| % CO₂ | 22.2 | 22.8 | 22.8 | 18.5 | 22.8 | 11.4 | 15.6 | 7.6 | — |
| % H₂ | 21.0 | 21.5 | 21.5 | 17.3 | 21.5 | 24.2 | 20.1 | 23.9 | — |
| % H₂O | 8.4 | 6.0 | 6.0 | 10.2 | 6.0 | 8.3 | 9.4 | 5.0 | — |
| % CH₄ | 1.6 | 1.7 | 1.7 | 1.7 | 1.7 | 0.3 | 1.1 | 1.0 | — |
| % N₂ | 0.6 | 0.6 | 0.6 | 0.6 | 0.6 | 1.0 | 0.8 | 0.6 | 2 |
| % O₂ | — | — | — | — | — | — | — | — | 98 |

Tests have been conducted to determine the electrical resistance at various temperatures of a packed bed burden consisting of 89 percent nominal 12 mm diameter pellets of approximately 90 percent metallization, 10 percent nominal 12 mm diameter coal char from low volatile bituminous coal and 1 percent limestone of nominal 6 mm diameter. In Table 3 the resistivity represents the resistance through a burden having a face area one meter square and a resistance path depth of one meter. The table represents points taken from a curve of plotted data points:

The processes of either FIG. 1 or FIG. 2 can be operated without a bustle gas preheater 74 by closing the valve in pipe 72. In this case, a large percentage of the gas entering the reduction zone through inlet 78 is cold which will reduce the average temperature of the solid particles leaving the reduction zone. Therefore additional heat must be supplied through the oxy fuel burners 94 to raise the temperature of the solid particles to melting temperature. Additional electric energy is also required to raise the temperature of the cold bustle gas to reaction temperature in the reducing zone of the furnace.

Table 4 compares the furnace energy requirements when bustle gas preheater 74 is used in the furnaces of both FIG. 1 and FIG. 2 and when the bustle gas preheater is bypassed.

TABLE 4

FURNACE ENERGY REQUIREMENTS

| FIG. | ELECTRIC ENERGY kWh/t | PROCESS COAL Gcal/t (HHV) | BURNER COAL Gcal/t (HHV) | BUSTLE GAS PREHEATER | % OF MELTING HEAT FROM BURNERS |
|---|---|---|---|---|---|
| 1 | 893 | 2.38 | 0.67 | YES | 50% |
| 2 | 672 | 2.31 | 1.34 | YES | 100% |
| 1 | 1162 | 2.35 | 0.95 | NO | 50% |
| 2 | 914 | 2.28 | 1.74 | NO | 100% |

TABLE 3

| Temperature | Resistivity in Ohm-Meters |
|---|---|
| 100° C. | .0055 |
| 300° C. | .0033 |
| 500° C. | .0020 |
| 700° C. | .0012 |
| 900° C. | .0007 |

The preferred reduction temperature in the furnace of the present invention is in the range of 900° to 1000° C. The burden resistivity in this temperature range at either low or high metallization requires relatively high current at relatively low voltage which makes practical the resistance heating of the burden without need for sophisticated electrical insulation or grounding means.

Table 5 shows the operating figures for a direct reduction furnace being operated in accordance with FIG. 1 without using bustle gas preheater 74. Therefore, nearly 100% of the energy required to heat the direct reduced iron and gangue above reduction temperature and to melt it is supplied by the oxy fuel burner 94.

TABLE 5

|  | A | B | C | D | E | F | G | H | I |
|---|---|---|---|---|---|---|---|---|---|
| Flow - (Nm3/t Prod) | 1442 | 1407 | 787 | 620 | 0 | 258 | 878 | 1413 | 98 |
| Temp. - (°C.) | 302 | 43 | 43 | 43 | — | 982 | 316 | 982 | 25 |
| Analysis - |  |  |  |  |  |  |  |  |  |
| % CO | 46.6 | 47.7 | 47.7 | 47.7 | — | 54.8 | 52.6 | 62.3 | — |

TABLE 5-continued

|  | A | B | C | D | E | F | G | H | I |
|---|---|---|---|---|---|---|---|---|---|
| % $CO_2$ | 22.3 | 22.9 | 22.9 | 22.9 | — | 11.4 | 16.6 | 7.7 | — |
| % $H_2$ | 20.7 | 21.2 | 21.2 | 21.2 | — | 24.2 | 19.2 | 23.6 | — |
| % $H_2O$ | 8.3 | 6.0 | 6.0 | 6.0 | — | 8.3 | 9.6 | 4.9 | — |
| % $CH_4$ | 1.6 | 1.7 | 1.7 | 1.7 | — | 0.3 | 1.3 | 1.0 | — |
| % $N_2$ | 0.5 | 0.5 | 0.5 | 0.5 | — | 1.0 | 0.7 | 0.5 | 2 |
| % $O_2$ | — | — | — | — | — | — | — | — | 98 |

Table 6 shows the operating figures for a direct reduction furnace being operated without a bustle gas preheater 74 but in all other aspects in accordance with the invention as depicted in FIG. 2 where nearly 100% of the energy required to heat the direct reduced iron gangue above reduction temperature and to melt it is supplied by the oxy fuel burner 94.

TABLE 6

|  | A | B | C | D | E | F | G | H | I |
|---|---|---|---|---|---|---|---|---|---|
| Flow - (Nm3/t Prod) | 1447 | 1409 | 977 | 432 | 0 | 473 | 905 | 1419 | 180 |
| Temp. - (°C.) | 309 | 43 | 43 | 43 | — | 982 | 538 | 982 | 25 |
| Analysis - |  |  |  |  |  |  |  |  |  |
| % CO | 46.0 | 47.2 | 47.2 | 47.2 | — | 54.8 | 53.3 | 61.7 | — |
| % $CO_2$ | 22.1 | 22.7 | 22.7 | 22.7 | — | 11.4 | 14.7 | 7.6 | — |
| % $H_2$ | 21.2 | 21.8 | 21.8 | 21.8 | — | 24.2 | 21.0 | 24.1 | — |
| % $H_2O$ | 8.5 | 6.0 | 6.0 | 6.0 | — | 8.3 | 9.2 | 5.0 | — |
| % $CH_4$ | 1.6 | 1.7 | 1.7 | 1.7 | — | 0.3 | 1.0 | 1.0 | — |
| % $N_2$ | 0.6 | 0.6 | 0.6 | 0.6 | — | 1.0 | 0.8 | 0.6 | 2 |
| % $O_2$ | — | — | — | — | — | — | — | — | 98 |

SUMMARY OF THE ACHIEVEMENTS OF THE OBJECTS OF THE INVENTION

It is clear from the above that we have invented a method and apparatus for directly reducing iron oxide to molten iron in a shaft type reduction furnace utilizing solid fuel as the reductant source in which energy input requirements are greatly reduced over present commercial direct reduction plants and with more efficient operation than was theretofore possible.

It is understood that the foregoing description and specific examples are merely illustrative of the principles of the invention and that various modifications and additions may be made thereto by those skilled in the art without departing from the spirit and scope of the invention as set forth in the appended claims.

What is claimed is:

1. A method for reducing particulate iron oxide to molten iron with a solid reductant, comprising
   a. continuously feeding a charge of particulate iron oxide and solid particulate carbonaceous fuel to a particle inlet at the top of a shaft furnace to establish a packed bed burden therein leaving a stockline at the top thereof;
   b. passing an electric current through the burden to provide sufficient heat by electric resistant heating to react said carbonaceous fuel with oxygen from said particulate iron oxide to reduce said iron oxide substantially to metallic iron and to melt the iron and form a molten iron pool in the bottom of said furnace;
   c. heating the lower portion of said burden above said molten metal pool with an oxy-fuel burner;
   d. causing the reaction products to move through said particulate burden in counterflow relation therewith and form a top gas;
   e. removing said top gas from the upper region of the shaft furnace;
   f. cooling the top gas;
   g. recirculating the cooled top gas to the burden through a gas inlet at the lower region of said furnace above the elevation of the oxy-fuel burners;
   h. removing molten iron product and slag from the bottom of said furnace.

2. A method according to claim 1 further comprising preheating said cooled top gas prior to recirculating it to the burden.

3. A method according to claim 1 wherein said particulate carbonaceous fuel is selected from the group comprising coal, coke, and lignite.

4. A method according to claim 1 wherein the oxy-fuel burner is provided with a source of oxygen and a source of fuel selected from the group comprising pulverized coal, oil, tar, natural gas, oil scrubber sludge, reacted top gas, and combinations thereof.

5. A method according to claim 1 further comprising adding up to about five weight percent of limestone, dolomite, or a mixture thereof to the charge.

6. A method according to claim 4 wherein a portion of said cooled top gas acts as the conveying gas for said source of fuel.

* * * * *